United States Patent
Michimura et al.

(10) Patent No.: US 10,079,949 B2
(45) Date of Patent: Sep. 18, 2018

(54) IMAGE FORMING APPARATUS AND STORAGE MEDIUM

(71) Applicant: FUJI XEROX CO., LTD., Tokyo (JP)

(72) Inventors: Tadao Michimura, Kanagawa (JP); Masanori Satake, Kanagawa (JP); Masao Morita, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 15/450,484

(22) Filed: Mar. 6, 2017

(65) Prior Publication Data
US 2018/0091689 A1    Mar. 29, 2018

(30) Foreign Application Priority Data

Sep. 26, 2016    (JP) .................. 2016-187290

(51) Int. Cl.
| | |
|---|---|
| *G06F 3/12* | (2006.01) |
| *H04N 1/00* | (2006.01) |
| *G06F 9/451* | (2018.01) |
| *G05B 15/02* | (2006.01) |
| *G06F 9/44* | (2018.01) |

(52) U.S. Cl.
CPC ......... *H04N 1/00941* (2013.01); *G05B 15/02* (2013.01); *G06F 9/4443* (2013.01); *G06F 9/451* (2018.02); *H04N 1/00408* (2013.01); *H04N 1/00474* (2013.01); *H04N 2201/0094* (2013.01)

(58) Field of Classification Search
CPC ........... H04N 1/00941; H04N 1/00408; H04N 1/00474; H04N 2201/0094; G05B 15/02; G06F 9/4443

USPC ........................................................ 358/1.13
See application file for complete search history.

(56) References Cited

U.S. PATENT DOCUMENTS

| | | | |
|---|---|---|---|
| 5,894,573 A | 4/1999 | Fukasawa et al. | |
| 2006/0044587 A1* | 3/2006 | Yoshida | H04N 1/00 358/1.13 |
| 2010/0053695 A1* | 3/2010 | Togami | H04N 1/00413 358/448 |
| 2012/0023451 A1 | 1/2012 | Kuroyanagi | |
| 2012/0262752 A1* | 10/2012 | Kyoo | H04N 1/00225 358/1.14 |
| 2014/0043632 A1* | 2/2014 | Uchida | G06F 3/1297 358/1.13 |

FOREIGN PATENT DOCUMENTS

| | | |
|---|---|---|
| JP | H06-337794 A | 12/1994 |
| JP | H11-265278 A | 9/1999 |
| JP | 2012-027662 A | 2/2012 |
| JP | 2012-248102 A | 12/2012 |

* cited by examiner

*Primary Examiner* — Neil R McLean
(74) *Attorney, Agent, or Firm* — Oliff PLC

(57) ABSTRACT

An image forming apparatus includes an application on a framework, that is separated into a core logic portion handling basic processing and a user interface frame portion handling rendering processing and operates; and a controller that executes the application and the framework. The core logic portion is implemented with an application programming interface defined by the framework. The application includes plural applications including a specific application, a core logic portion of the specific application stores user information collectively in a user context, and a core logic portion of another application acquires the user information from the user context.

5 Claims, 14 Drawing Sheets

```
App/
    common/
        comlib1
        comlib2
    copy/
        baseframe.html
        base_manifest.json
        copy/
            uiframe.html
            app_manifest.json
        idcopy/
            uiframe.html
            app_manifest.json
```

FIG. 8

```
applicationInfoList : [
{
    "base" :
        {
            "id" : "appId.std.copy",
            "url" : "app/copy/baseframe.html"
        },
    "apps" : [
        {
            "subId" : "copy",
            "type" : "STD",
            "appUrl" : "app/copy/copy/uiframe.html",
            "isLaunchable" : true,
            "orderWeight" : 100,
            "largeIcon" : "common/img/preset/apps/app_copy_120.png",
            "smallIcon": "common/img/preset/apps/app_copy_48.png",
            "author" : "Fuji Xerox Co.,Ltd.",
            "description" : "Standard Copy Application",
            "displayName" : "COPY",
            "displayNameId" : "001"
        },
        {
            "subId" : "idcopy",
            "type" : "STD",
            "appUrl" : "app/copy/idcopy/uiframe.html",
            "isLaunchable" : true,
            "orderWeight" : 1300,
            "largeIcon" : "common/img/preset/apps/app_idcardcopy_120.png",
            "smallIcon" : "common/img/preset/apps/app_idcardcopy_48.png",
            "author" : "Fuji Xerox Co.,Ltd.",
            "description" : "ID Card Copy Application",
            "displayName" : "IDCOPY",
            "displayNameId" : "002"
        }
    ]
}
]
```

FIG. 10A

```
App/
    common/
        comlib1
        comlib2
    copy/
        baseframe.html
        base_manifest.json
        copy/
            uiframe.html
            app_manifest.json
        idcopy/
            uiframe.html
            app_manifest.json
```

FIG. 10B

```
App/
    common/
        comlib1
        comlib2
    copy/
        baseframe.html
        base_manifest.json
        copy/
            uiframe.html
            app_manifest.json
        idcopy_for_xxx
            uiframe.html
            app_manifest.json
```

FIG. 10C

```
App/
    common/
        comlib1
        comlib2
    copy_for_xxx/
        baseframe.html
        base_manifest.json
        copy/
            uiframe.html
            app_manifest.json
        idcopy
            uiframe.html
            app_manifest.json
```

IMAGE FORMING APPARATUS AND STORAGE MEDIUM

CROSS-REFERENCE TO RELATED APPLICATIONS

This application is based on and claims priority under 35 USC 119 from Japanese Patent Application No. 2016-187290 filed Sep. 26, 2016.

BACKGROUND (i) Technical Field

The present invention relates to an image forming apparatus and a storage medium.

(ii) Related Art

The functions of a multifunction machine having functions, such as copy, print, and fax, are further expanded, and hence it is requested to efficiently construct the entire system including various applications.

SUMMARY

According to an aspect of the invention, an image forming apparatus includes an application on a framework, that is separated into a core logic portion handling basic processing and a user interface frame portion handling rendering processing and operates; and a controller that executes the application and the framework. The core logic portion is implemented with an application programming interface (API) defined by the framework. The application includes plural applications including a specific application, a core logic portion of the specific application stores user information collectively in a user context, and a core logic portion of another application acquires the user information from the user context.

BRIEF DESCRIPTION OF THE DRAWINGS

An exemplary embodiment of the present invention will be described in detail based on the following figures, wherein:

FIG. 8 is an explanatory view showing a specific configuration example of an application list;

FIGS. 10A to 10C are explanatory views at change of UI and logic;

DETAILED DESCRIPTION

An exemplary embodiment of the present invention is described below with reference to the figures.

General System Configuration

Figure 1:
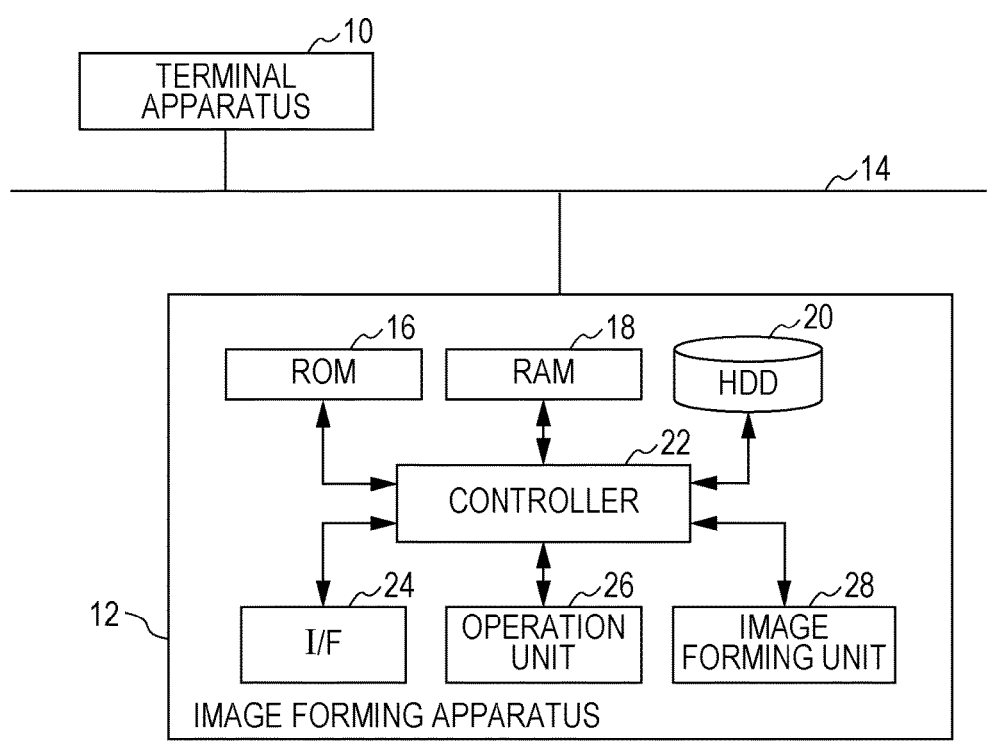
FIG. 1 is a functional block diagram of an image forming apparatus.

FIG. 1 is a configuration block diagram of an image forming system including an image forming apparatus according to this exemplary embodiment. The image forming system includes a terminal apparatus 10 and an image forming apparatus 12. The terminal apparatus 10 and the image forming apparatus 12 are connected with one another through a communication unit 14. The communication unit 14 uses, for example, a data communication network, such as a local area network (LAN).

The terminal apparatus 10 is connected with the image forming apparatus 12 through the communication unit 14, and transmits, for example, a print job including a print command of a document in accordance with an instruction of a user.

The image forming apparatus 12 includes a read-only memory (ROM) 16, a random access memory (RAM) 18, a hard disk drive (HDD) 20, a controller 22 configured of one or plural central processing units (CPUs), an input/output interface (I/F) 24, an operation unit 26 such as a touch panel, and an image forming unit 28.

The controller 22 configured of the one or plural CPUs receives, for example, a print job command from the terminal apparatus 10 through the input/output I/F 24, interprets page-description language (PDL) data and generates intermediate data, and further generates rendering data (raster data) from the generated intermediate data, in accordance with a processing program stored in the ROM 16. Also, the controller 22 executes various commands, such as copy, scan, and fax, received from the operation unit 26.

The image forming unit 28 includes a print module, a scan module, a fax module, a paper feed module, a document feed module, and an image processing accelerator.

The print module has a function of outputting an image on paper. For example, the print module includes a configuration of known inkjet method, and prints rendering data on paper. The print module discharges liquid or molten solid ink from a nozzle or the like, and executes recording on paper, film, or another material. Methods of discharging ink include a drop-on-demand method of discharging ink by using electrostatic attraction force (pressure pulse method), and a thermal inkjet method of discharging ink by using a pressure generated by forming and growing air bubbles with heat at high temperature. A recording head to be used includes, for example, a head that discharges cyan ink, a head that discharges magenta ink, a head that discharges yellow ink, and a head that discharges black ink. Each head uses a line head having at least a width equivalent to the width of paper. Ink droplets of the respective colors are discharged on an intermediate transfer body by the recording head for recording, and then transferred on paper for printing.

The scan module reads an image from paper and converts the image into electronic data.

The fax module includes a modem and a fax image processing module, and executes a fax function.

The paper feed module transports paper from a paper tray to the print module.

The document feed module transports paper from a document tray to the scan module.

The image processing accelerator is a module that executes compression/expansion processing in association with, for example, the scan module. The image processing accelerator is not necessarily provided and may be an additional module.

The image forming apparatus 12 may include, in addition to the aforementioned modules, a finisher that provides, for example, punching and sorting for paper; a universal serial bus (USB); an authentication unit that is configured of an integrated circuit (IC) card reader or the like, and authenticates a user; a billing unit; and/or a human sensor, a face camera, or the like.

Also, the image forming apparatus 12 may be connected with the Internet through the communication unit 14, or may include Ethernet (registered trademark) and/or Wi-Fi (registered trademark).

Logic Configuration of Program

Figure 2:
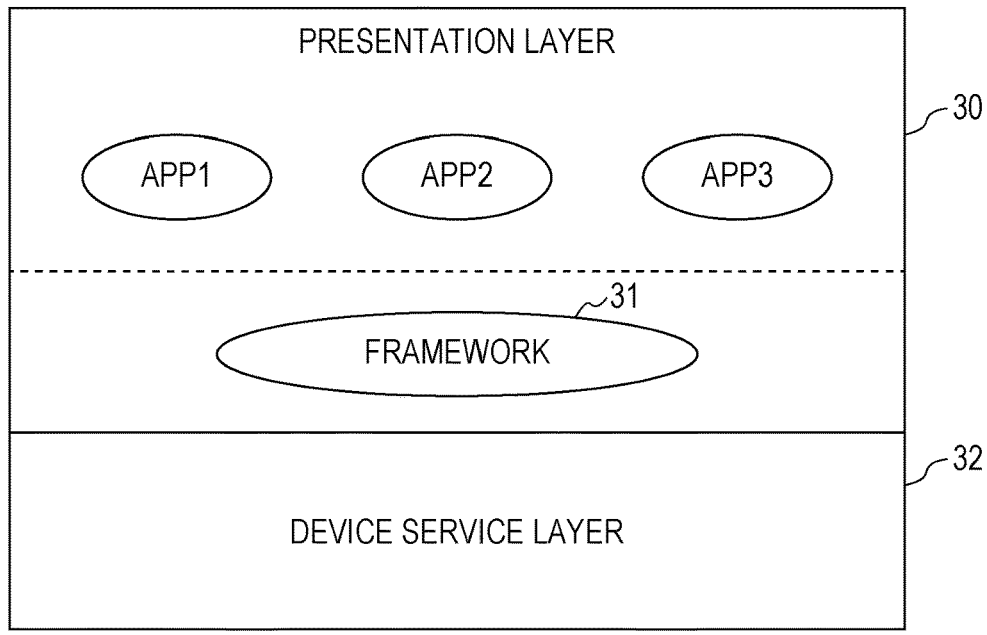
FIG. 2 is a logic configuration diagram of a system.

FIG. 2 shows a logic configuration of the system executed by the controller 22. The system is roughly separated into two layers including a presentation layer 30 and a device service layer 32.

The presentation layer 30 is a layer in which various applications are implemented, and includes a framework 31 and various applications. The framework 31 is an execution environment software group that allows JavaScript (registered trademark) applications to be operable on a computer system. To be more specific, JavaScript is executed on a web browser, and base frame and UI frame are loaded as iframe of HyperText Markup Language (HTML). Also, such an application is JavaScript software implemented with an application programming interface provided by the framework 31. The framework 31 manages the life cycles of the various applications. That is, for each of the various applications, the framework 31 creates a base frame, reads a core logic of the application, and gives an instruction of initialization to the core logic. Also, at deactivation of the system, the framework 31 gives an instruction of finalization to the core logic of each of the various applications, and deletes the base frame. The core logic and the life cycle management of each of the various applications are described later in more detail.

The device service layer 32 is a layer that manages various hardware devices. The hardware devices include, for example, the print module of the above-described image forming unit 28.

Figure 3:
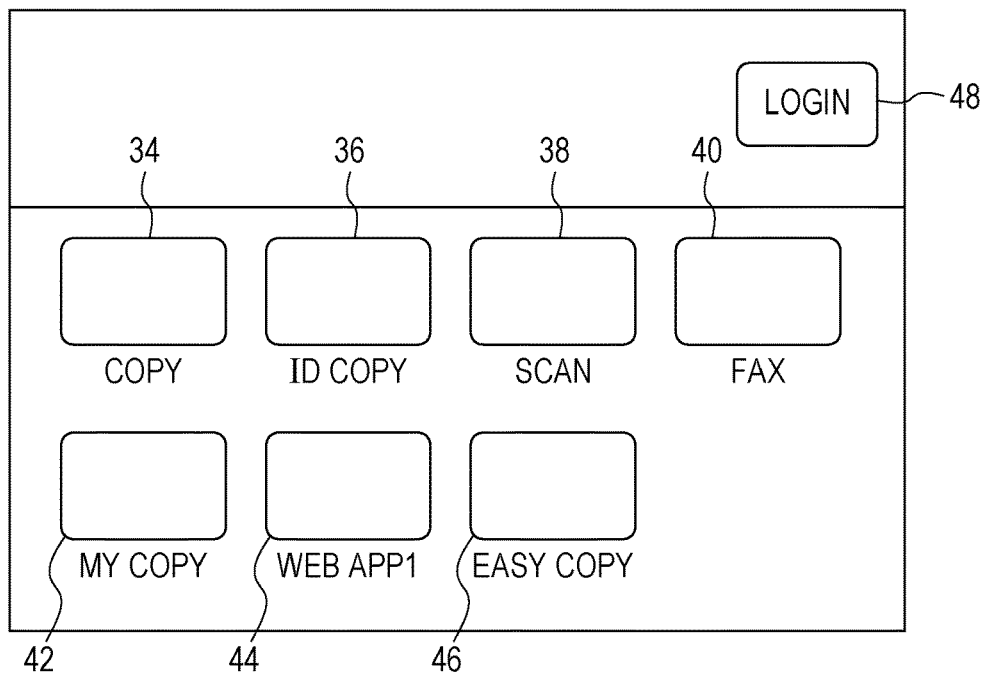
FIG. 3 is an explanatory view showing an example of a home screen.

FIG. 3 shows an example of a screen (home screen) displayed on the operation unit 26 of the image forming apparatus 12. The home screen includes icons displayed thereon. The icons include a copy button 34, an ID card copy (ID copy) button 36, a scan button 38, a fax button 40, a my copy button 42, a web application (web app1) button 44, and an easy copy button 46. When a user touches and selects one of the buttons, an application assigned to the button is activated, and the screen transitions to an application screen. The user may recognize that a button corresponds to an application.

Each application is JavaScript software implemented with the application programming interface provided by the framework 31 as described above, and is a component that provides a function directly to the user. Each application has a common configuration defined by the framework 31. Also, each application is configured to have a low link degree with respect to another application. Applications include an application that operates in cooperation with the user through a user interface (UI) and an application that does not cooperate with the user. The application that cooperates with the user subjectively executes displaying and inputting through the presentation layer 30.

The figure also shows a login button 48 for the user to log in. This button also corresponds to an application.

Implementation Structure of Application

Figure 4:
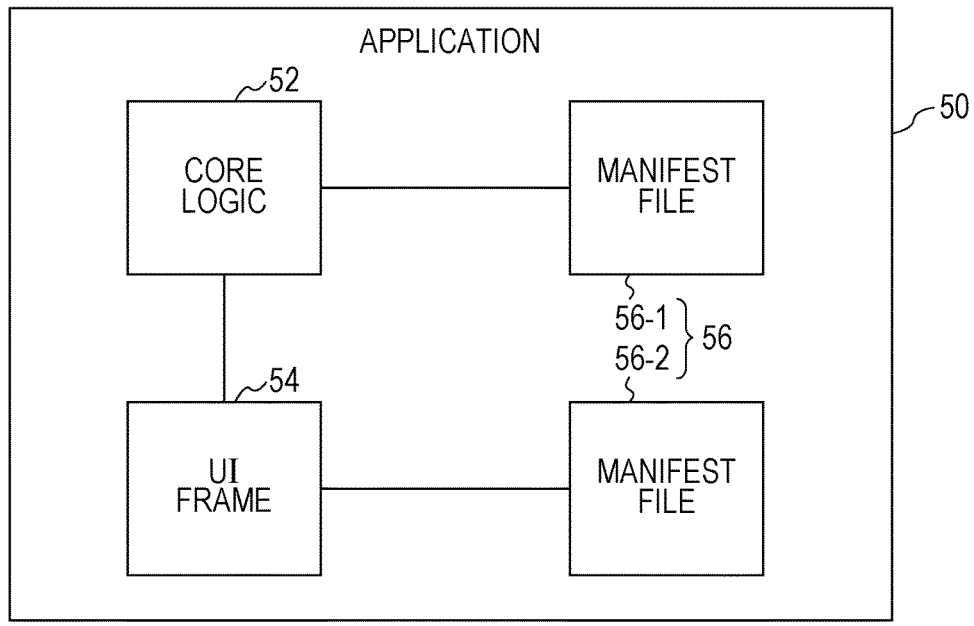
FIG. 4 is a logic configuration diagram of an application.

FIG. 4 shows a structure of an application. An application 50 is roughly separated into three components. That is, the application 50 is separated into a core logic 52, a UI frame 54, and a manifest file 56. In this case, "separation" does not represent physical separation, but represents logical separation.

The core logic 52 is a component that executes basic processing (basic behavior and inter-application association) as an application, and is necessarily present in each application. The core logic provides an application programming interface defined by the framework 31.

The UI frame 54 is a component that provides rendering and displaying as an application, or more specifically, is managed as a display window.

The manifest file 56 is a list of passive information on each application. The passive information may include an identifier (ID), a display name, an icon image, a version, a creation date, and so forth, of the application. The manifest file 56 includes a core logic manifest file 56-1 and a UI frame manifest file 56-2. A piece of information to be written by the manifest file 56 is isLaunchable attribute. With this attribute, it is determined whether or not the application is displayed as an icon (button) on the home screen. The attributes are as follows:

display is selected if isLaunchable=true; and non-display is selected if isLaunchable=false.

With this configuration, communication rules between the core logic 52 and the UI frame 54 are as follows:

(1) the core logic 52 communicates with another core logic 52; and (2) the UI frame 54 communicates with only the core logic 52.

Therefore, the UI frame 54 does not communicate with another UI frame 54.

Figure 5:
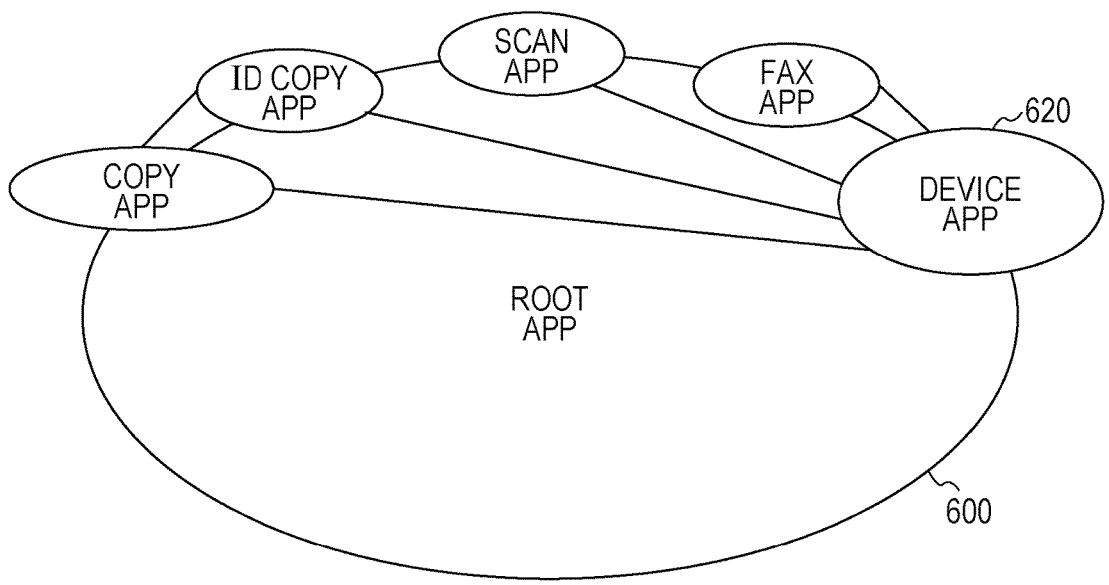
FIG. 5 is a logic configuration diagram of a system of related art.

FIG. 5 shows a program configuration of related art. In related art, a large root application (root app) 600 is prepared and various functions to be used from respective applications are provided. All the applications depend on this root application 600. Also, a device application (device app) 620 that dedicatedly handles the states of various devices is also independently present. Substantially all the applications depend on this device application 620. Further, common implementation among applications progresses, and the applications depend on one another. Hence, even in a case where an application is added or deleted, adjustment is required among the applications every time the case occurs, and the root application 600 is constantly required to be corrected. An application may not be easily added or deleted.

Figures 6, 7:
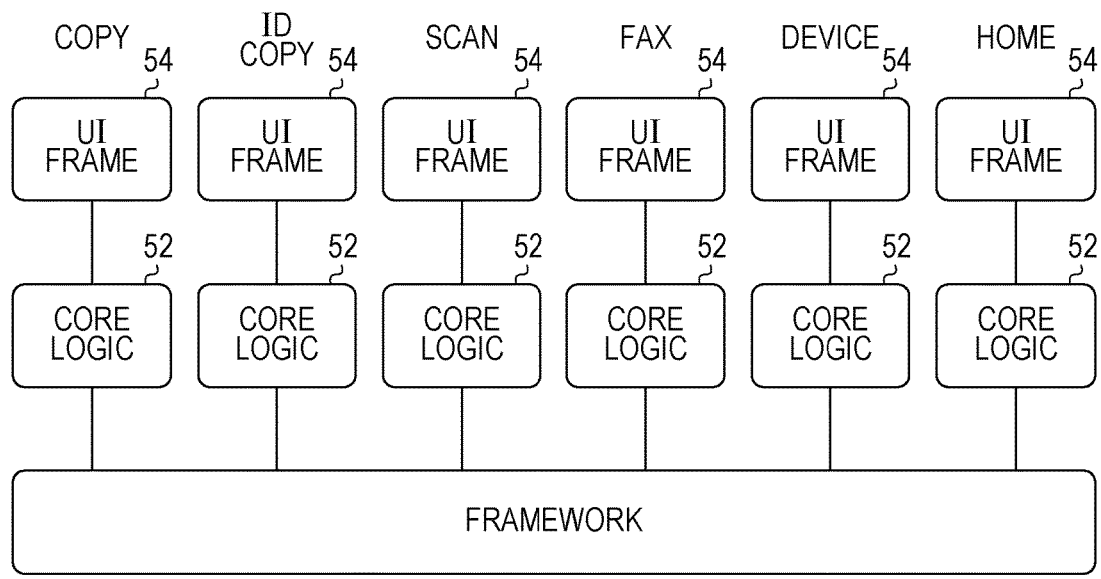
FIG. 6 is a configuration diagram of applications on a framework.
FIG. 7 is an explanatory view showing a specific configuration example of an application.

In contrast, FIG. 6 shows a program configuration of this exemplary embodiment. Each application is separated into a core logic 52, a UI frame 54, and a manifest file 56. The core logic 52 of each application is connected with a framework 31. The UI frame 54 of each application is connected with the core logic 52 of the application.

For example, exemplarily describing a copy application, the copy application is separated into a core logic 52, a UI frame 54, and a manifest file 56. The core logic 52 is connected with the framework 31. The UI frame 54 is connected with the core logic 52. Link among respective applications is limited without dependence unlike related art, and hence association among the applications is executed by the framework 31 through the core logics 52. The core logic 52 of each application provides an application programming interface defined by the framework 31. Hence, when an application is newly added, the addition may be easily executed by providing the application programming interface defined by the framework 31. Also, since the link among the applications is limited, an application may be easily deleted.

FIG. 7 shows an example of the copy application. In FIG. 7, baseframe.html is a core logic 52, and base_manifest.json is a manifest file 56-1 of the core logic 52. Also, uiframe.html is a UI frame 54, and app_manifest.json is a manifest file 56-2 of the UI frame 54.

FIG. 8 shows an example of an application list. In FIG. 8, "base" represents a manifest file 56-1 of a core logic 52, and "app" represents a manifest file 56-2 of a UI frame 54. In the manifest file 56-2, "type" represents the type of an application. The types of applications are as follows.

In particular, applications include four types.
STD: an application preinstalled
OT: a shortcut of the application preinstalled (STD)
EXT: an application that may be added (type I application)
CS: an application that may be added (type II application)
Applications preinstalled are applications corresponding to copy, scan, fax, and so forth, shown in FIG. 3. Also, each application of OT, EXT, and CS is assigned with a special companion application. Each companion application handles a corresponding function. Each companion application also includes a core logic 52 similarly to the STD application. Since the manifest file 56 includes the type of an application, the internal implementation of each application may be discriminated from that of another application.

Also, "isLaunchable" in the manifest file 56-2 is attribute information that determines whether or not an icon is displayed on the home screen as described above. In FIG. 8, the display is as follows.
isLaunchable=true
This represents that the copy button is displayed.

Since the application is separated into the core logic 52 and the UI frame 54, the application list describes the correspondence therebetween.

A manifest file 56 is created for each application. Hence, it is desirable to set an identifier representing the type of each application and a unique identifier in the type. For example, the manifest file of the copy application has identifiers as follows.
type: STD
ID: copy
In these identifiers, type is an identifier representing a type (an application preinstalled), and ID is a unique identifier.

Further, the manifest file 56 includes information required at activation and information required for rendering the home screen as static information. The information required at activation is storage location information on the core logic 52 and storage location information on the UI frame 54. The framework 31 loads the core logic 52 with reference to the storage location information on the core logic 52. Also, the core logic 52 loads the UI frame 54 if required with reference to the storage location information on the UI frame 54.

The information required for rendering the home screen is storage location information on icon buttons and the display order of the buttons.

The manifest file 56 is referenced by an application management component in the device service layer and is used for creating an application list (described later).

Figure 9:
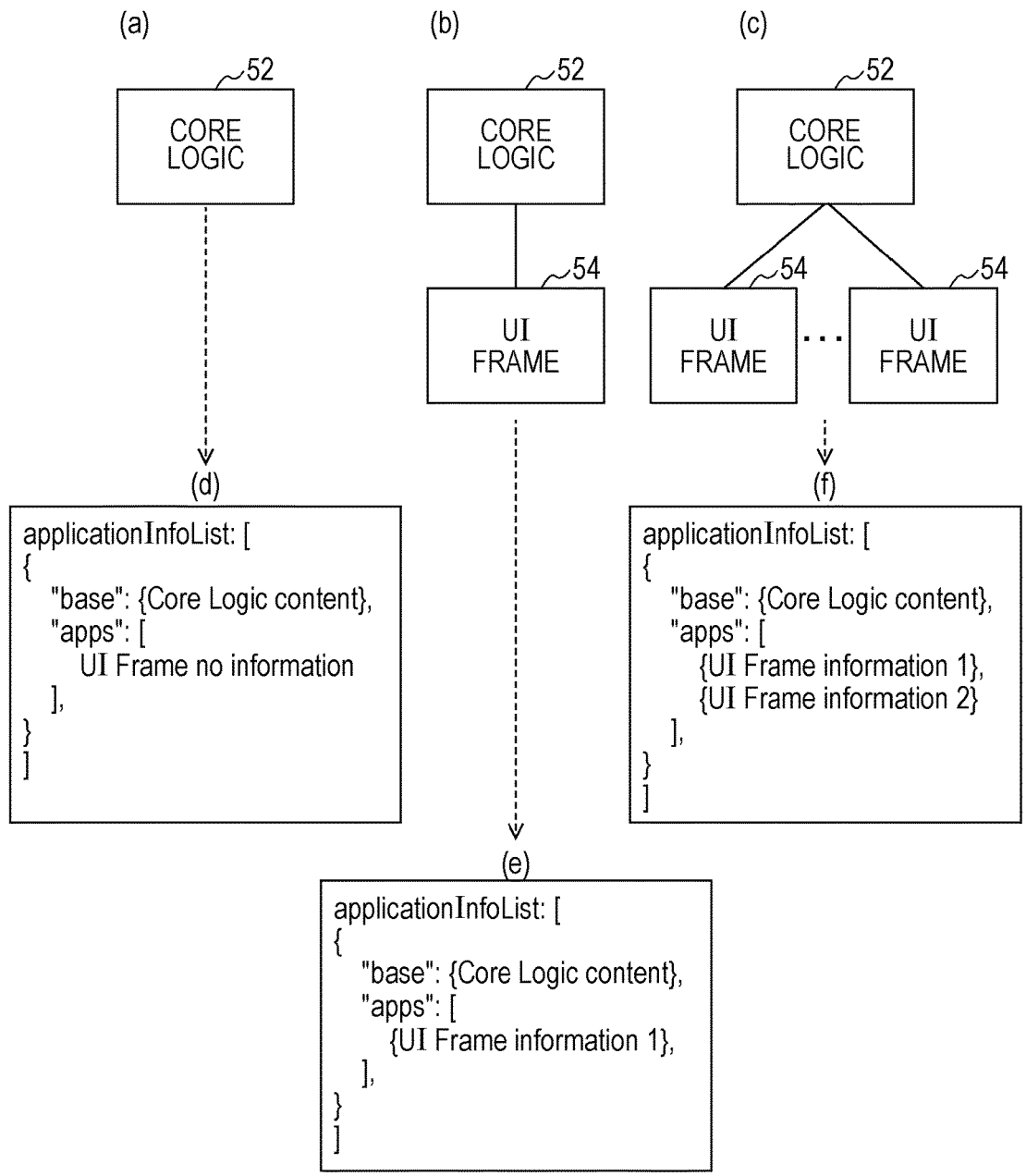
FIG. 9 provides explanatory views showing patterns of core logics and UI frames.

FIG. 9 shows patterns of implementation structures of applications.

Part (a) in FIG. 9 meets a pattern in which a core logic 52 is present but a UI frame 54 is not present. This does not correspond to an application preinstalled but corresponds to, for example, a companion application. Part (d) in FIG. 9 is an application list corresponding to part (a) in FIG. 9.

Part (b) in FIG. 9 meets a pattern in which a core logic 52 and a UI frame 54 are present by one-to-one correspondence. Part (e) in FIG. 9 is an application list corresponding to part (b) in FIG. 9.

In contrast, part (c) in FIG. 9 shows a case where a core logic 52 and plural UI frames 54 are present, and the plural UI frames 54 share the common core logic 52. A UI frame 54 determines a display style when a button is displayed on the home screen. Even when plural buttons are displayed, by sharing the common core logic 52, efficiency of implementation is increased. Also, if plural applications share the common core logic 52, performance of maintenance is increased. The number of UI frames 54 sharing the common core logic 52 is not limited. Part (f) in FIG. 9 is an application list corresponding to part (c) in FIG. 9. A specific example of a manifest file 56-1 is, for example, as follows.

```
{
    "id": "appId.std.copy",
    "url": "app/copy/baseframe/baseframe.html"
}
```

A specific example of a manifest file 56-2 is, for example, as follows.

```
{
    "subId": "copy",
    "type": "STD",
    "appUrl": "app/copy/uiframe.html",
    "isLaunchable": true,
    "orderWeight": 100,
    "largeIcon":
"common/img/preset/app/app_copy_120.png",
    "smallIcon": "common/img/preset/app/app_copy_48.png",
    "displayName": "Copy",
    "displayNameId": "001"
}
```

Another example is as follows.

```
{
    "subId": "idcopy",
    "type": "STD",
    "appUrl": "app/copy/idcopy/uiframe.html",
    "isLaunchable": true,
    "orderWeight": 900,
```

```
        "largeIcon":
"common/img/preset/app/app_idcardcopy_120.png",
        "smallIcon":
"common/img/preset/app/app_idcardcopy_48.png",
        "displayName": "IDCardCopy",
        "displayNameId": "002"
}
```

In part (b) in FIG. 9 and part (c) in FIG. 9, by setting the isLaunchable attribute value of the manifest file 56-2 of the UI frame 54, it is determined whether or not a button is actually displayed on the home screen. For example, in part (c) in FIG. 9, in the case where the first UI frame 54 and the second UI frame 54 sharing the common core logic 52 are present, the manifest file of the first UI frame 54 is isLaunchable=true, and the manifest file of the second UI frame 54 is isLaunchable=false, the former one is displayed as a button but the later one is not displayed.

As an execution structure of an application, a core logic 52 is separated from a UI frame 54. Hence, only the UI frame 54 may be changed without changing the core logic 52, and the display style on the screen of an application may be easily customized.

FIGS. 10A to 10C each show an example of customizing the display style on the screen.

FIG. 10A is an initial display style. Focusing on an application of ID card copy, its UI frame 54 is idcopy/uiframe.html, and its manifest file 56-2 is idcopy/app_manifest.json.

FIG. 10B shows a case where the display style is customized. In the application of ID copy, the UI frame 54 and the manifest file 56-2 are replaced with idcopy_for_xxx/uiframe.html and idcopy_for_xxx/app_manifest.json for a new display style. Of course, it is also possible to replace only the manifest file 56-2.

In contrast, FIG. 10C shows a case where not the display style but the logic of the application is changed. In this case, all the core logic 52, the UI frame 54, and the manifest file 56 are replaced with new components. That is, the part indicated by copy is replaced with copy_for_xxx.

Figure 11A:
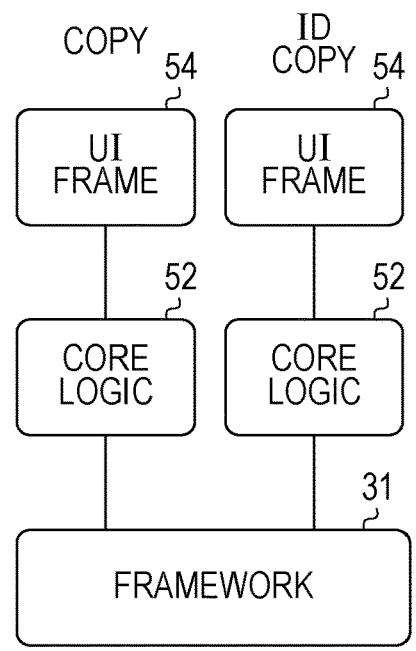
FIGS. 11A and 11B are explanatory views each showing a pattern of applications on a framework.
Figure 11B:
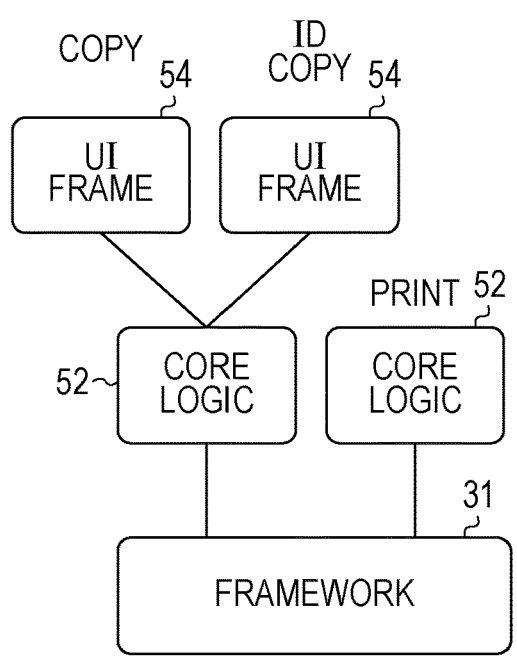

FIGS. 11A and 11B each show a pattern of an implementation structure of specific applications including a framework 31.

FIG. 11A shows an example of a pattern in a case where the copy application and the ID copy application are implemented. The copy application is separated into a core logic 52 and a UI frame 54. The core logic 52 communicates with a framework 31. The UI frame 54 communicates with only the core logic 52. Similarly, the ID copy application is separated into a core logic 52 and a UI frame 54. The core logic 52 communicates with the framework 31. The UI frame 54 communicates with only the core logic 52.

FIG. 11B shows another example in a case where a print application is implemented in addition to the copy application and the ID copy application. The copy application and the ID copy application are separated into a common core logic 52 and respective UI frames 54. That is, the copy application and the ID copy application communicate with a framework 31 through the common core logic 52. Also, the print application has a core logic 52, but does not have a UI frame 54. FIGS. 11A and 11B include all patterns shown in FIG. 9.

In an application implementation structure of related art, a core logic 52 and a UI frame 54 are not separated from one another unlike the aforementioned structure, and processing and screen rendering are mixed, resulting in a complicated structure. Also, a common programming interface of applications is not present, and each application freely publicizes a programming interface and freely references the programming interface. In contrast, in this exemplary embodiment, the framework 31 defines an application programming interface, and the core logic 52 of each application is necessarily implemented with the application programming interface. Hence, the direction of the application programming interface in this exemplary embodiment differs from that of related art. Also, in addition to communication between the framework 31 and each of applications, a communication programming interface among the applications may be realized by a programming interface publicization function and an application programming interface reference function provided by the framework 31.

In theory, plural applications may share a common UI frame 54 and may respectively have individual core logics 52. However, in this case, the structure may be complicated in the viewpoint of the framework 31, and hence this case is not particularly described in this exemplary embodiments. Of course, it is not necessarily intended to exclude this pattern.

Life Cycle Management for Application

Figure 12:
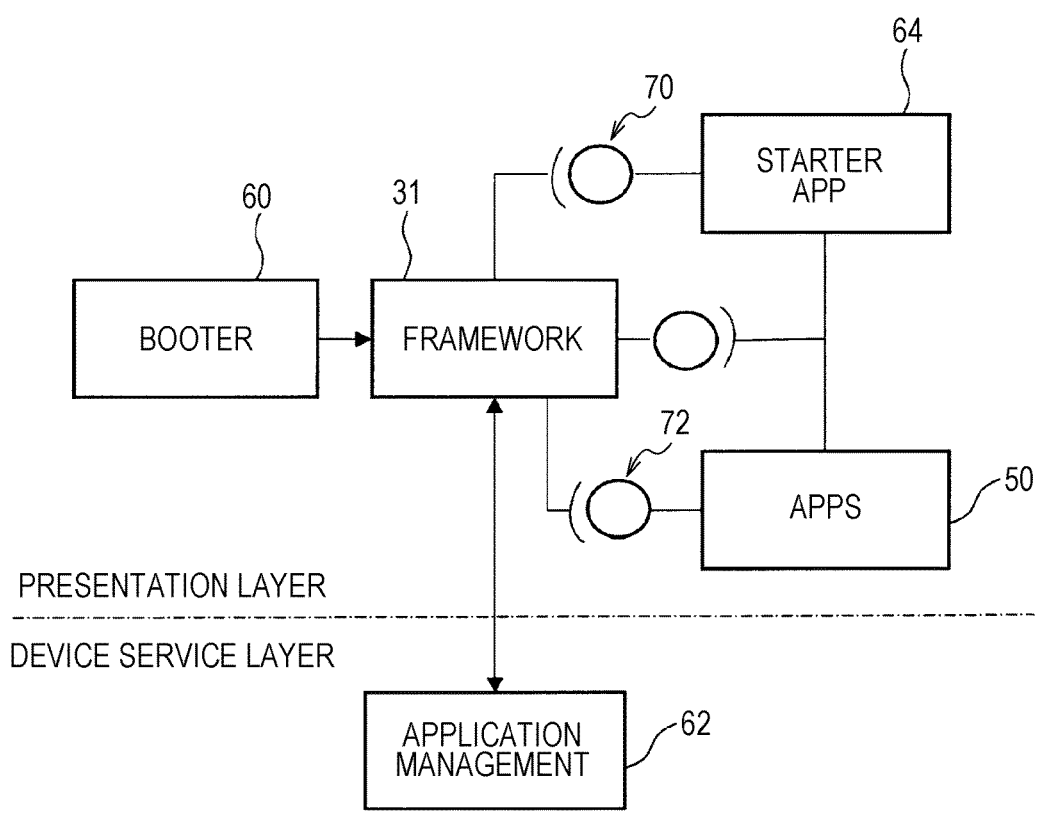
FIG. 12 is a system configuration diagram of life cycle management including a booter and a starter.

FIG. 12 shows a basic configuration when a framework 31 executes life cycle management for each application. In this case, the framework 31 is an execution environment of applications.

A framework 31 and various applications 50, and in addition, a booter 60 and a starter application 64 are present in the presentation layer. Also, an application management component 62 is present in the device service layer.

The booter 60 is a component that executes activation/deactivation management of the entire presentation layer. The framework 31 is initialized and activated by the booter 60.

The application management component 62 provides an application list to the framework 31 on the basis of manifest files 56 of the various applications 50.

The starter application 64 is an application that is implemented with a starter programming interface 70 defined by the framework 31. The starter application 64 is only one application present in the system, and is called from the framework 31 when initialization of all the applications 50 is completed.

The various applications 50 include the copy application, ID copy application, fax application, and so forth, and include core logics 52 as described above. The core logics 52 of the various applications 50 each are implemented with an application programming interface 72 defined by the framework 31.

Specifically, the application programming interface implemented in each application 50 is as follows.

Initialization processing (initialize)
finalization processing (finalize)
window pushed out processing (windowPushedOut)
window prepare exposed processing (windowPrepareExposed)
window prepare terminated processing (windowPrepareTerminated)

Each application 50 is implemented with a handler for these events.

The framework 31 includes a JavaScript component (referred to as communication control component) for enabling publicization/call of a method, and publicization/purchase/issue of an event among the core logics 52 of the various applications 50. A method may be defined to take a desirable parameter and to return a desirable return value. The publicized method is independently managed on an application basis. The application that calls the method may check completion of processing of the method by callback. Also, an event may be defined by each application with desirable data. The publicized event is independently managed on an application basis. To be more specific, the communication control component enables publicization and call of a method by the core logic 52, enables definition and issue of an event and registration of a listener, publicizes the method by "ON," and stops the publicization of the method by "OFF." The publicized method is able to be called by call. For example, the first application sets a certain application programming interface "on" for publicization to the framework 31, and the second application makes "call" for the publicized programming interface of the first application to the framework 31.

Figure 13:
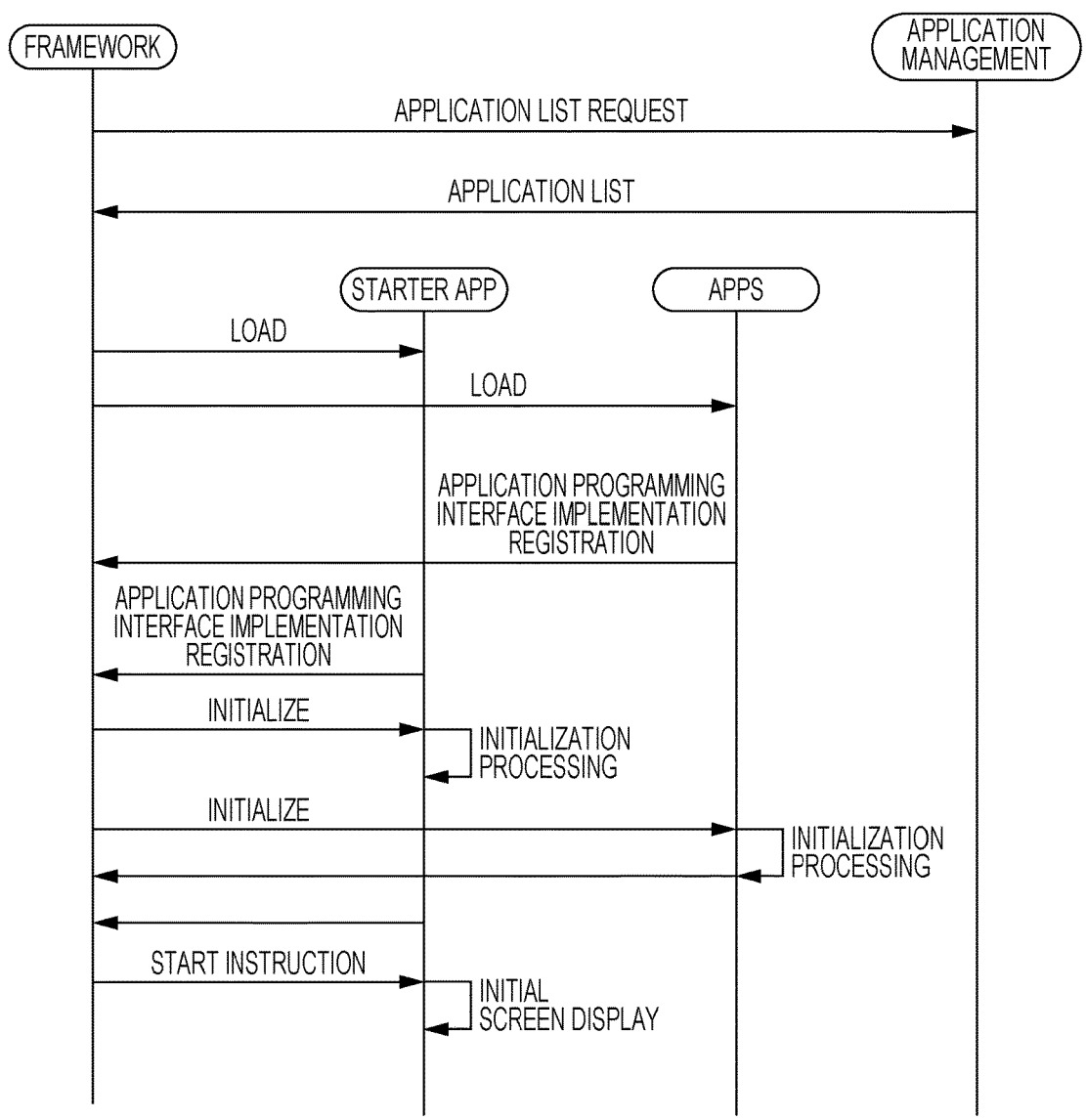
FIG. 13 is a sequence diagram of the life cycle management.

FIG. 13 is a sequence diagram of life cycle management for each of the various applications by the framework 31.

When the booter 60 activates the framework 31, the framework 31 requests an application list from the application management component 62 in the device service layer, and acquires the application list from the application management component 62.

When the framework 31 acquires the application list, the framework 31 creates a base frame on an application basis according to the list, and loads the various applications 50 including the starter application 64 (load phase). That is, the framework 31 reads the core logic 52 of each application. To be specific, the framework 31 loads the core logic 52 with reference to storage location information on the core logic 52 defined in the manifest file 56. The base frame is a frame for executing the core logic 52 of each application, and this frame is not displayed. The load order of the core logics 52 of the respective applications is desirably determined and the order is not particularly limited. This phase goes to the next phase at a time point at which all the applications have completed registration of application programming interface implementation.

It is to be noted that the method and event of each application are publicized before the registration processing of the application programming interface implementation.

Next, the framework 31 gives an instruction of initialization to each application through the application programming interface (initialize phase). To be specific, the framework 31 issues "app" event and "initialize" method to each application. At a time point at which all the applications callback after the process completion in response to the initialization instruction, the framework 31 notifies the booter 60 about the completion of the initialization processing, and the phase goes to the next phase. The order of initialization of the respective applications may be also desirably determined. In this initialization processing, each application executes data acquisition from the device service layer.

Then, the booter 60 gives a start instruction for provision of a function by an application to the framework 31, and the framework 31 gives a start instruction to the starter application 64 in response to the given instruction (start phase). The starter application 64 acquires information on an initial activation application managed in the device service layer, and displays an initial screen. This phase is completed at a time point at which the starter application 64 callbacks after the process completion in response to the start instruction.

At deactivation of the system, the framework 31 gives an instruction of finalization to the core logic 52 of each application. Also, the framework 31 deletes the base frame of each application.

In the load phase, the core logics 52 of the respective applications are read without a particularly limited order. Hence, even when an application is added, the load phase does not have to be changed. Also, in the initialize phase, all the applications are initialized. Hence, the other applications are assuredly called, and individual synchronization is not required. As described above, since the synchronization among the applications is no longer required and only the core logics 52 with relatively small sizes are loaded, the system activation time and the application activation time are reduced.

If each application independently publicizes an application programming interface, activation, pre-initialization processing, initialization processing, post-initialization processing, stop, temporary stop, and so forth, are different on an application basis. A difference is generated in initialization level of each application, and the timing at which the application is able to be called also varies. In particular, it is required to check whether or not a subject application is able to be called before the application is called. The control may be complicated. In contrast, in the exemplary embodiment, the initialization time may be reduced as described above, and the activation time of the home screen after the initialization may be reduced.

Figure 14:
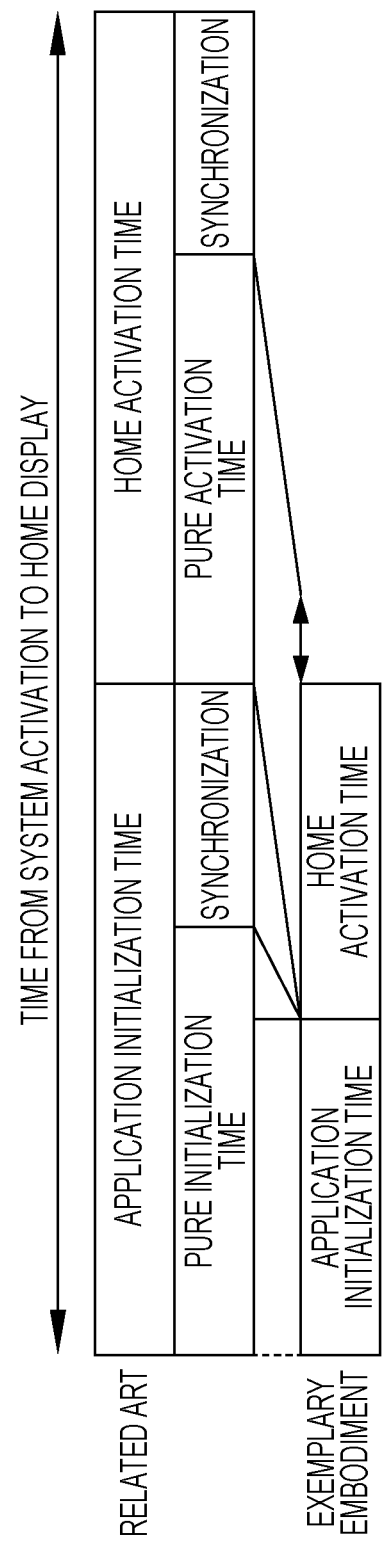
FIG. 14 is a graph showing time from system activation to home screen display.

FIG. 14 shows the time from system activation to home screen display according to related art and the exemplary embodiment.

In related art, the application initialization time requires synchronization in addition to pure initialization time, and the activation time of the home screen requires synchronization in addition to pure activation time similarly. In contrast, in this exemplary embodiment, the pure initialization time may be reduced, and the synchronization may be eliminated. Also, for the home activation time, similar effect may be provided. In related art, if applications depend on one another, adjustment is required to prevent deadlock from being generated. However, in this exemplary embodiment, such dependence is not present, and hence deadlock adjustment is no longer required.

As described above, in this exemplary embodiment, an application is separated into a core logic 52 and a UI frame 54, an application programming interface defined by a framework 31 is implemented in the core logic 52, the core logic 52 communicates with a core logic 52 of another application through the framework 31, and the UI frame 54 communicates with only the core logic 52 of the application. Accordingly, each application has a common configuration defined by the framework 31, and may be configured to have a low link degree with another application. An application may be easily added or deleted.

Described next is a case where a user executes login after the home screen is displayed.

In related art, when a user logs in, each application receives an event notification from a lower layer about login of the user, and executes processing of changing the user. That is, each application independently acquires information on the user who is currently logged in.

In contrast, in this exemplary embodiment, as the number of activated applications increases, fetching user information from the lower layer requires time by the amount of the fetching. Owing to this, an application that handles login processing acquires user information from the lower layer and collectively stores the user information, and each application references the collectively stored user information.

Figure 15:
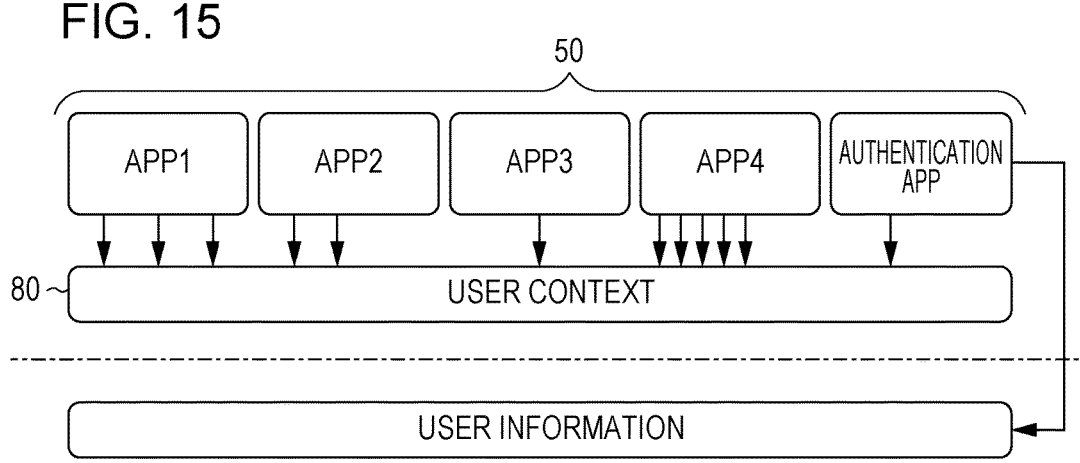
FIG. 15 is an explanatory view of a user context.

FIG. 15 schematically shows processing at login according to the exemplary embodiment. At login of a user, an application (authentication app or auth application) that handles login among various applications 50 acquires information on the user from a lower layer, and stores the information in a user context 80. Then, when an application other than the authentication app acquires user information, the application does not fetch the user information from the lower layer, but acquires the required user information by referencing the user context 80 created by the authentication app (more specifically, created by the core logic 52 of the authentication app). Accordingly, the user information may be easily acquired in short time as compared with related art. For example, the user context 80 is created as follows.

UC1: active
UC0: inactive
UC2: inactive
UC3: inactive

In this case, active represents an active state, and inactive represents an inactive state. Active and inactive are described later.

FIGS. 16 to 19 are operation flowcharts of the user context 80 associated with login.

Figure 16:
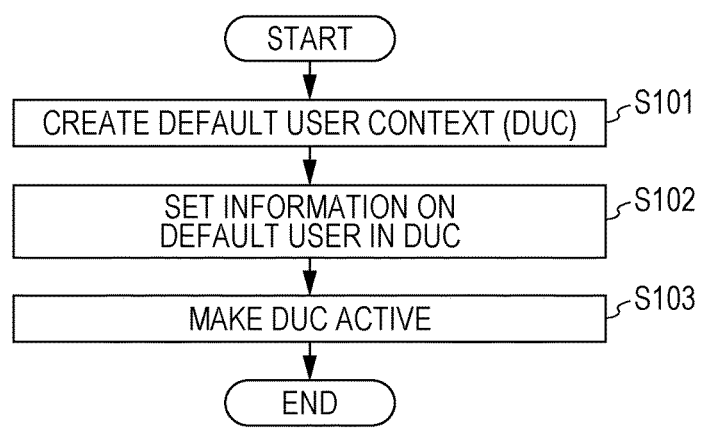
FIG. 16 is a first operation processing flowchart for the user context.

First, FIG. 16 illustrates processing at activation of the system. The authentication app that handles login acquires default user information from a lower layer. Then, the authentication app creates DUC as a default user context 80 (S101).

Then, the authentication app sets the default user information acquired from the lower layer in the created DUC (S102). Then, the authentication app makes the DUC having the default user information set therein active (S103).

Figure 17:
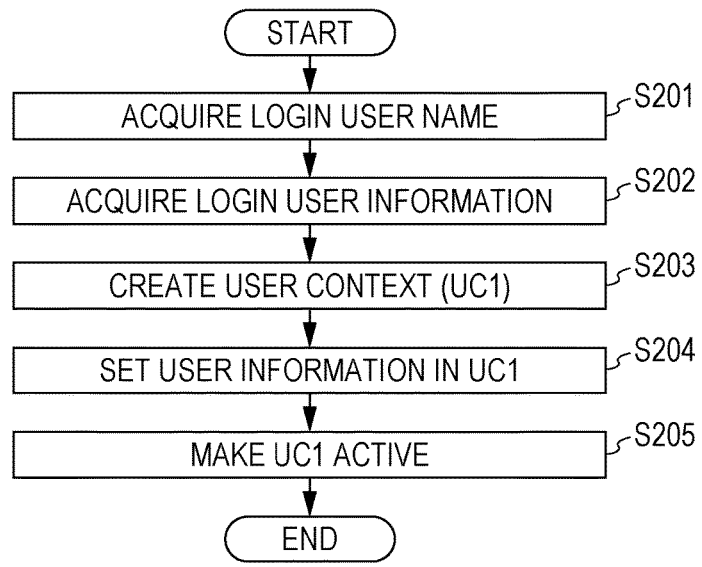
FIG. 17 is a second operation processing flowchart for the user context.

FIG. 17 illustrates processing when a user makes login. The authentication app acquires the name of the user who logs in (login user name) (S201).

Then, the authentication app acquires information on the login user from the lower layer (S202).

Then, the authentication app creates a user context 80 (S203), and sets the information on the login user acquired in S203 in the user context 80 (referred to as UC1) (S204). Then, the authentication app makes the UC1 having the information on the login user set therein active (S205). At this time, if another active UC is present, the UC becomes inactive. (There is one active UC.)

Figure 18:
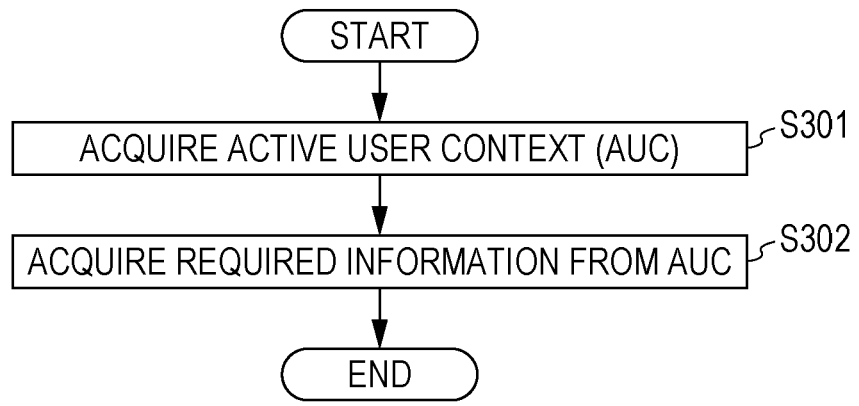
FIG. 18 is a third operation processing flowchart for the user context.

FIG. 18 illustrates processing of each application 50 after login. Each application 50 references the user context 80 being active (AUC) (S301). In this case, since the UC1 is active, the application references the UC1.

Then, the application acquires required user information from the UC1 being the active user context 80 (S302).

Figure 19:
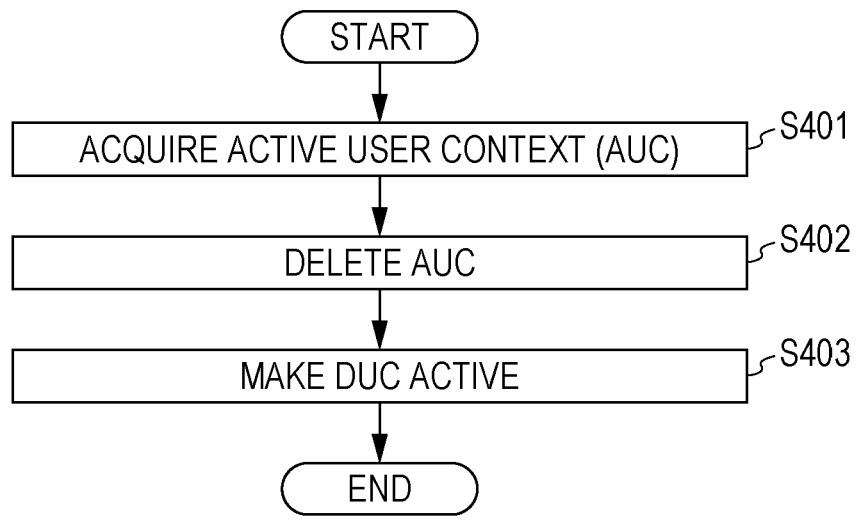
FIG. 19 is a fourth operation processing flowchart for the user context.

FIG. 19 illustrates processing when a user logs out. First, the authentication app acquires a user context 80 currently being active (AUC) (S401). The authentication app instructs the lower layer on logout. Then, the authentication app acquires default user information from the lower layer. Then, the authentication app creates DUC as a default user context, and sets the default user information acquired from the lower layer in the created DUC. Then, the authentication app makes the default user context 80 active instead of the AUC (S403). The authentication app deletes the user context 80 which has been active (S402).

It may be understood that a new user context 80 is created every time when a user logs in, information on the user is set in the user context 80, and the user context 80 becomes active.

Figure 20A:
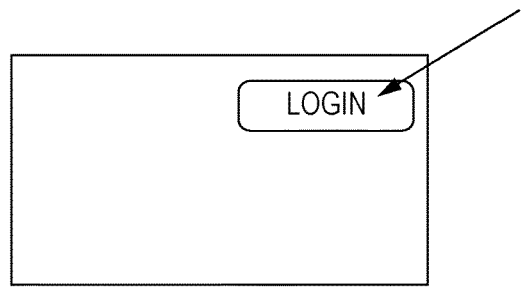
FIGS. 20A to 20C are screen explanatory views at login.
Figure 20B:
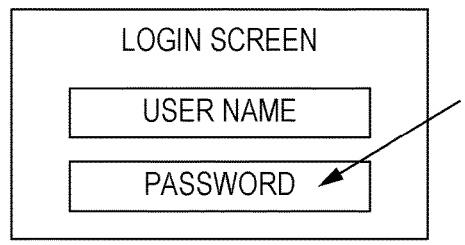
Figure 20C:
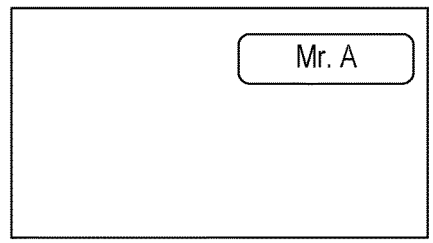

FIGS. 20A to 20C each show a screen at login. FIG. 20A is an initial screen, and displays a "login" icon at a predetermined position. This icon is associated with the authentication app being an application that handles login. The user context 80 in this case is a default user context 80, that is, DUC.

FIG. 20B is a screen example when the user operates the login icon. The screen transitions to an input screen for a user name and a password. When the user inputs the user name and the password, the authentication app verifies the input user name and password. If the authentication app authenticates that the user is a valid user, the authentication app newly creates a user context 80, sets information on the login user in the user context 80, and makes the user context 80 active.

When the user context 80 is newly changed, each application 50 acquires new user information from the active user context 80. However, if all the applications 50 fetch the information in the user context 80, the number of accesses increases although being still efficient as compared with the case of fetching information from the lower layer like related art.

Hence, focusing on that an application dominant in the display screen among the various applications 50 is limited to an application located at the top of the screen, when a subject application is displayed at the top of the screen, the application acquires information on the login user with reference to the active user context 80. Accordingly, the number of accesses may be reduced.

FIG. 20C is a screen after the login processing. An application that renders the home screen is at the top of the screen. The information on the login user is acquired with reference to the active user context 80, and the user name (in the figure, Mr. A) is displayed at a predetermined position (in the figure, the position of the login icon) on the screen.

The user information is set in the user context 80. In particular, the following information may be set.

User name
User icon
User display language
User keyboard language, user input language For example, in the case of the user display language, when a user logs in, the authentication app acquires the ID of the login user and stores the ID in the user context 80, and in addition, stores the display language as one piece of user information on the user in the user context 80. Then, the application transitions to app1 among the various applications 50. The app1 acquires the display language with reference to the user context 80, creates a screen in accordance with the display language, and displays the screen. Similarly, when the application transitions to another app2, the app2 acquires the display language with reference to the user context 80, creates a screen in accordance with the display language, and displays the screen.

The above-described processing is processing relating to the user information. However, the system may include unique information such as a system setting value, in addition to the user information. To be more specific, the unique information is, for example, product storage information and machine-specific information. In related art, each application fetches the unique information from the lower layer when the application requires the unique information (in particular, at activation of the system). However, a specific application may similarly acquire such unique information from the lower layer and collectively store the unique information as context, and each application may reference the context.

Figure 21:
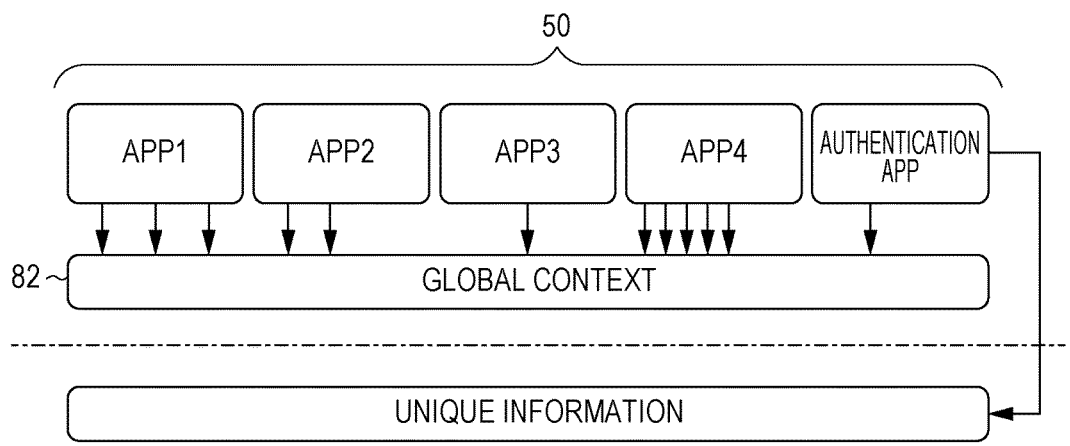
FIG. 21 is an explanatory view of a global context.

FIG. 21 schematically shows the configuration in this case. At activation of the system, an application in charge (in the figure, the authentication app; however, it is not particularly limited) among the various applications 50 acquires information on the user from the lower layer, and stores the information in a global context 82. Then, when the respective applications 50 acquire unique information, the applications 50 do not fetch the unique information from the lower layer, but acquire the required unique information with reference to the global context 82 created by the authentication app. Accordingly, the unique information may be easily acquired in short time as compared with related art. At activation of the system, the framework 31 may create a default global context 82 first, and then the application in charge may acquire the unique information and set the information in the global context 82.

A "component" in this exemplary embodiment represents a component of software that may be logically separated. A component may be executed by one or plural processors. In this exemplary embodiment, JavaScript is used. However, of course, any one of other programming languages may be used.

Also, the present invention is not limited to the above-described exemplary embodiment, and may be modified in various ways. Modifications are described below.

Modifications

In the exemplary embodiment, the controller (processor) 22 of the image forming apparatus 12 executes the framework 31 and the various applications 50 in the presentation layer 30. However, since the presentation layer 30 and the device service layer 32 are separated from one another as shown in FIG. 2, an individual apparatus different from the image forming apparatus 12, for example, a processor in a mobile terminal, such as a smart phone or a tablet terminal, for controlling the image forming apparatus 12 may execute the framework 31 and the various applications 50 in the presentation layer 30. Also, the operation unit 26 in FIG. 1 is desirably mounted on the mobile terminal. In this case, the mobile terminal and the image forming apparatus 12 may be collectively called image forming apparatus or image forming system.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
an application on a framework, that is separated into a core logic portion handling basic processing and a user interface frame portion handling rendering processing and operates on the framework; and
a controller that executes the application and the framework,
wherein the core logic portion is implemented with an application programming interface defined by the framework, and
wherein the application includes a plurality of applications including an authentication application, a core logic portion of the authentication application retrieves stored user information in response to a user login to the image forming apparatus and stores the user information collectively in a user context, and a core logic portion of another application acquires the user information from the user context.

2. The image forming apparatus according to claim 1, wherein the core logic portion of the specific application included in the plurality of applications stores the user information in the user context in association with login of a user.

3. The image forming apparatus according to claim 1, wherein the application acquires the user information from the user context at a timing at which the application is displayed at the top of a screen.

4. An image forming apparatus comprising:
an application that is separated into a core logic portion handling basic processing and a user interface frame portion handling rendering processing and operates on a framework; and
a controller that executes the application and the framework,
wherein the core logic portion is implemented with an application programming interface defined by the framework, and
wherein the application includes a plurality of applications including an authentication application, a core logic portion of the authentication application retrieves stored system-specific information in response to a user login to the image forming apparatus and stores the system-specific information collectively in a global context, and a core logic portion of another application acquires the system-specific information from the global context.

5. A non-transitory computer readable medium storing a program causing a processor that controls an image forming apparatus to execute a process for image formation, the process comprising:
implementing an application programming interface defined by a framework in a core logic portion of an authentication application, and loading the core logic portion by the framework at activation of a system, the authentication application being separated into the core logic portion handling basic processing and a user interface frame portion handling rendering processing;
retrieving, by the a core logic portion of the authentication application, stored user information in response to login of a user to the image forming apparatus and storing the user information collectively in a user context.

* * * * *